United States Patent

[11] 3,576,135

| [72] | Inventor | Hubert F. A. Tschunko<br>Milton, Mass. |
|------|----------|---------------------------------------|
| [21] | Appl. No. | 874,733 |
| [22] | Filed | Nov. 7, 1969 |
| [45] | Patented | Apr. 27, 1971 |
| [73] | Assignee | The United States of America as represented by the Administrator of the National Aeronautics and Space Administration |

[54] ELECTROMECHANICAL CONTROL ACTUATOR SYSTEM
14 Claims, 5 Drawing Figs.

[52] U.S. Cl. .................................................. 74/89.15, 74/424.8
[51] Int. Cl. .................................................. F16h 27/02, F16h 1/05
[50] Field of Search .......................................... 74/89.15, 424.8 (A), 424.8 (B), 424.8 (C)

[56] References Cited
UNITED STATES PATENTS

| 2,473,566 | 6/1949 | Brassell | 74/424.8 |
| 2,943,508 | 7/1960 | Musser | 74/424.8 |
| 2,946,235 | 7/1960 | Musser | 74/424.8 |
| 3,404,580 | 10/1968 | Valenti | 74/424.8 |

Primary Examiner—William F. O'Dea
Assistant Examiner—Wesley S. Ratliff, Jr.
Attorneys—Herbert E. Farmer, John R. Manning and Garland T. McCoy ABSTRACT: A motion-transmitting device utilizing a double differential screw principle is disclosed. One differential screw mechanism including first and second sets of threads of different pitch is operatively coupled to another differential screw mechanism having third and fourth sets of threads of different pitch. By providing the first and second sets of threads with a pitch difference not equal to the difference in pitch between the third and fourth sets of threads, a double differential movement is established.

INVENTOR:
HUBERT F. A. TSCHUNKO,
BY
ATTORNEYS

PATENTED APR 27 1971

INVENTOR:
HUBERT F. A. TSCHUNKO,
BY
ATTORNEYS

ELECTROMECHANICAL CONTROL ACTUATOR SYSTEM

ORIGIN OF THE INVENTION

The invention described herein was made by an employee of the United States Government and may be manufactured and used by or for the government for governmental purposes without the payment of any royalties thereon or therefor.

BACKGROUND OF THE INVENTION

This invention relates generally to a motion-transmitting device and, more particularly, relates to a microactuator capable of executing displacements in the range from less than 50 A. to several centimeters.

Microactuators are required to control the adjustments, alignments, collimations and deflections of various optical and precision mechanical elements. Previous actuators of this type are based on the principles of magnetostriction, electrostriction, or thermal expansion. Also known are devices utilizing liquid or gas pressurization to produce linear movement. The prior art devices exhibit various disadvantages including requirements for power consumption to maintain positions, requirements for applied heat that frequently cause uncontrolled displacements because of thermal surges, and operations entailing step displacements that are individually too large for many applications.

The simplest and oldest actuator is the single mechanical screw. Although extremely reliable in its range of operations, the mechanical screw obviously is not capable of producing displacements in the microrange. A well-known improvement of the mechanical screw is the simple differential screw that utilizes the difference between a pair of linear movements produced by a single drive mechanism. The fine adjustment capability of the differential screw is substantially greater than the single mechanical screw but its ultimate fine adjustment capability is limited by machining accuracy.

The object of this invention, therefore, is to provide a relatively simple and reliable actuator capable of executing linear displacements in the range from less than 50 A to several centimeters.

SUMMARY OF THE INVENTION

The invention is characterized by the provision of a motion-transmitting device including a pair of operatively coupled differential screw mechanisms. One of the mechanisms comprises a primary drive member engaged by a first set of threads with a fixed support and by a second set of threads with a coupling member. The other differential screw mechanism comprises a secondary drive member engaged by a third set of threads with the coupling member and by a fourth set of threads with an actuator. By providing the first and second sets of threads with the same sense but different pitches a differential movement is obtained between the primary drive member and the coupling member. Similarly, providing the third and fourth sets of threads with the same sense but different pitches produces a differential movement between the secondary drive member and the actuator. Finally, the first and second sets of threads are provided with a difference in pitch that is itself different than the difference in pitch between the third and fourth sets of threads so as to establish relative axial movement between the coupling member and actuator in response to simultaneous rotation of the primary and secondary drive members. According to this arrangement extremely small and precise axial movements of the actuator member are obtained by appropriate rotation of the primary and secondary drive members.

One feature of the invention is the provision of a motion-transmitting device of the above type wherein the various sets of threads are provided with senses such that rotation of the primary and secondary drive members in the same direction produces movement of the coupling member and actuator in opposite directions relative to each other. In this embodiment rotation of the primary and secondary drive members in the same direction produces axial movement of the actuator relative to the fixed support over a distance equal to the difference between the relative movements produced between the primary drive member and coupling member and between the secondary drive member and actuator.

Another feature of the invention is the provision of a motion-transmitting device of the above type including a common drive mechanism for rotating the primary and secondary drive members at the same angular velocity. Use of a common drive mechanism helps insure predictable actuator movements by accurately establishing the relative movement relationships existing between the various components.

Another feature of the invention is the provision of a motion-transmitting device of the above type including separate drive mechanisms that permit independent rotation of the primary and secondary drive members. Use of independent drive mechanisms permits rotation of the primary and secondary drive members in opposite directions thereby accelerating relative movement of the actuator with respect to the fixed support and facilitating use of the device for relatively coarse adjustments.

Another feature of the invention is the provision of a motion-transmitting device of the above types including a compression spring member that maintains pressure between the first, second, third and fourth sets of threads. The bias exerted by the spring member eliminates detrimental backlash or frontlash of the coupled elements.

A featured embodiment of the invention comprises a motion-transmitting device of the above types wherein the primary, secondary and coupling members are all hollow cylinders; the first set of threads is formed by external threads on the primary drive cylinder and internal threads on the fixed support; the second set of threads is formed by internal threads on the primary drive member and external threads on the coupling member; the third set of threads is formed by internal threads on the coupling member and external threads on the secondary drive member, and the fourth set of threads is formed by internal threads on the secondary drive member and external threads on the actuator. This arrangement provides the desired double differential relative movements with a mechanical assembly that is extremely simple and compact.

BRIEF DESCRIPTION OF THE DRAWINGS

These and other objects and features of the invention will become more apparent upon a perusal of the following specification taken in conjunction with the accompanying drawings wherein.

DESCRIPTION OF THE PREFERRED EMBODIMENTS

Figure 1:
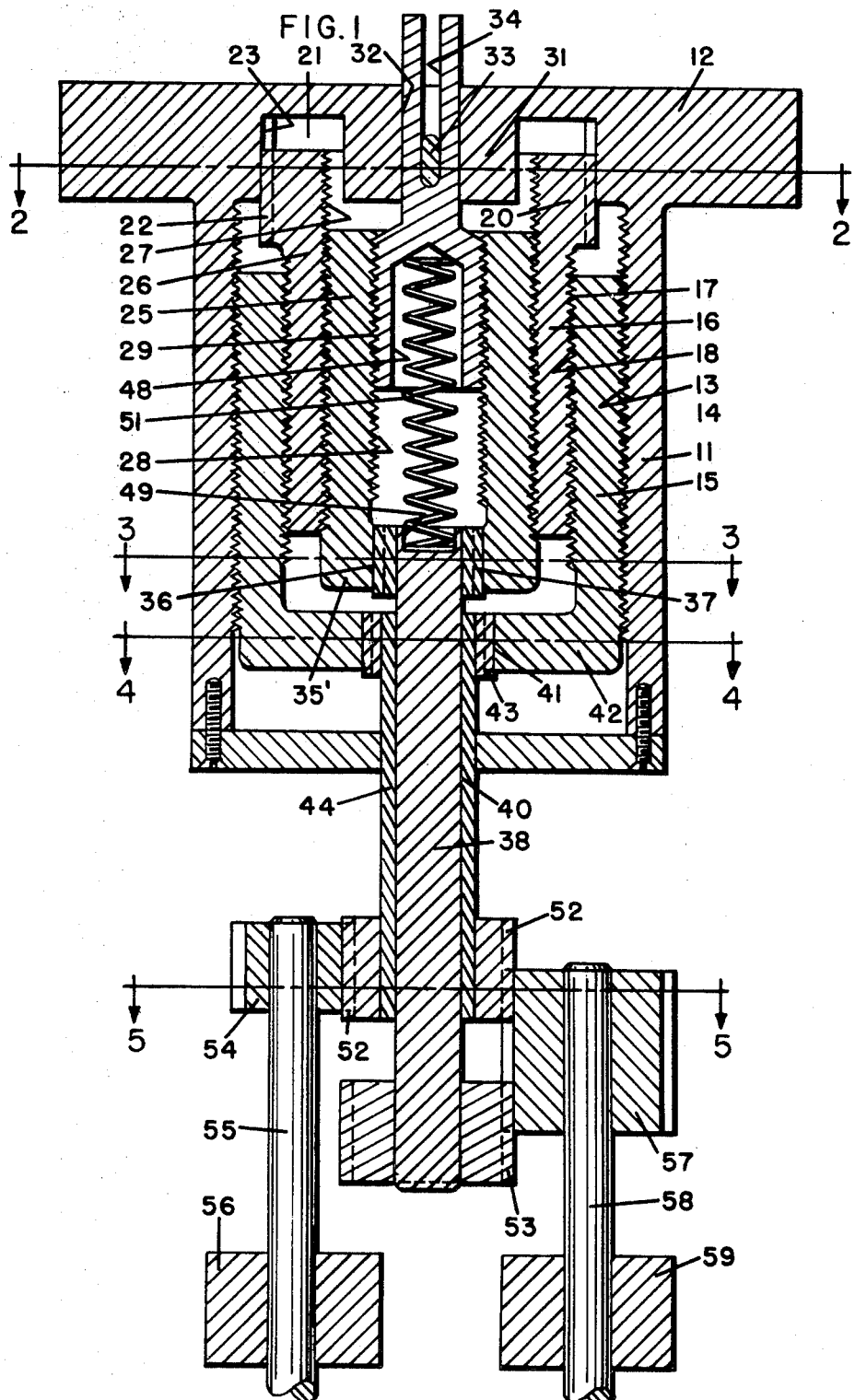
FIG. 1 is an elevational view in cross section illustrating a preferred embodiment of the invention.

Referring now to FIG. 1 there is shown a hollow cylindrical support housing 11 having a flange 12 suitable for attachment to an accommodating surface. Engaging internal threads 13 on the support housing 11 are external threads 14 on a primary hollow drive cylinder 15. A hollow cylindrical coupling 16 has external threads 17 that engage internal threads 18 on the primary drive cylinder 15. An annular recess 21 in the inner surface of the flange 12 receives a terminal portion of the coupling 16 and permits axial movement thereof. Rotation of the coupling 16 is prevented by key 22 extending from the outer surface of the terminal coupling portion 20 and projecting into axial slots 23 in the annular recess 21.

Figure 2:
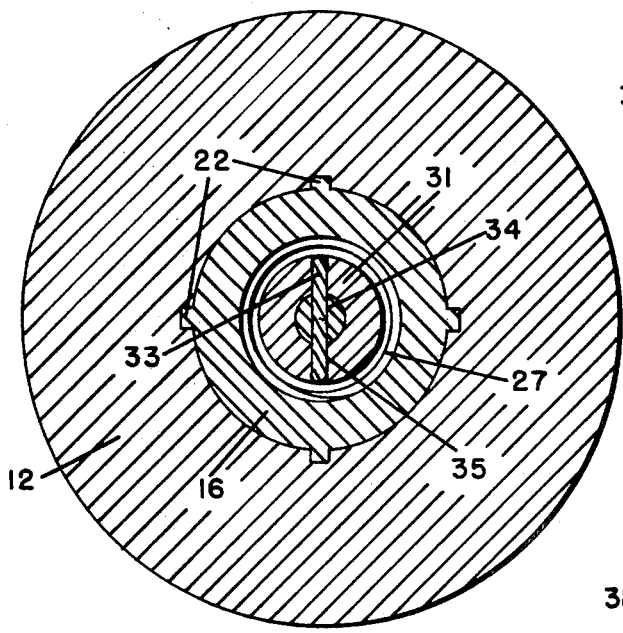
FIG. 2 is a cross-sectional view taken along lines 2–2 in FIG. 1.
Figure 3:
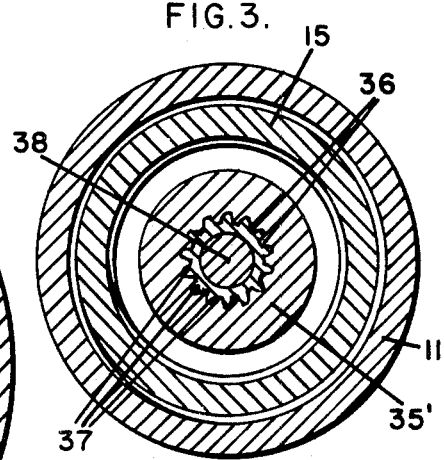
FIG. 3 is a cross-sectional view taken along lines 3–3 in FIG. 1.
Figure 4:
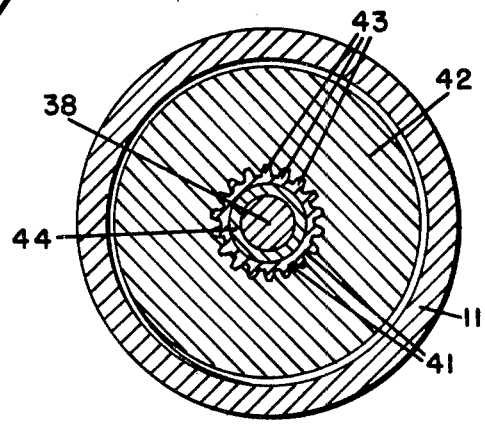
FIG. 4 is a sectional cross-sectional view taken along lines 4–4 in FIG. 1.
Figure 5:
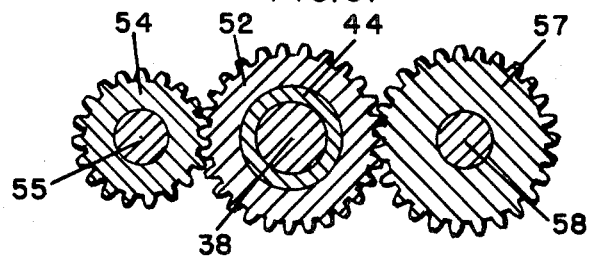
FIG. 5 is a cross-sectional view taken along lines 5–5 in FIG. 1.

A secondary hollow cylinder 25 has external threads 26 that engage internal threads 27 on the cylindrical coupling 16. The secondary drive cylinder 25 also possesses internal threads 28 that engage external threads 29 on an actuator rod 31. A central aperture 32 in the flange 12 receives the actuator rod 31 and permits axial movement thereof. Rotation of the actuator rod 31 is prevented by a key 33 that projects through a slot 35 (FIG. 2) in the flange 12.

Fixed to a reentrant portion 35' of the secondary drive cylinder 25 is an annular gear 36 that engages external teeth 37 on a solid drive shaft 38. A similar annular gear 41 is fixed to a reentrant portion 42 of the primary drive cylinder 15. The gear 41 engages external teeth 43 on a hollow drive shaft 44 concentric with and encompassing the solid drive shaft 38. Retained within recesses 48 and 49 in the actuator rod 31 and the solid drive shaft 38, respectively, and exerting a force therebetween is a compression spring 51.

Terminating the hollow drive shaft 44 and the solid drive shaft 38, respectively, are radially outward directed sets of teeth 52 and 53. A spur gear 54 is fixed to the end of a shaft 55 adapted for axial movement in a bearing support 56 and for attachment to a suitable rotary drive mechanism (not shown). Another spur gear 57 is fixed to a shaft 58 adapted for both rotary and longitudinal movement within a bearing support 59. The shaft 58 also is adapted for attachment to a suitable rotary drive mechanism (not shown). In one longitudinal position of the shaft 58 the gear 57 simultaneously engages the teeth 52 and 53 on both the solid shaft 38 and the hollow shaft 44 (as shown in FIG. 1) and in a second position the gear 57 engages only the teeth 53 on solid shaft 38.

A first set of threads comprising the internal threads 13 on the support housing 11 and the external threads 14 on the primary cylinder 15 have the same sense (as commonly identified by either right- or left-hand designations) but a different pitch than a second set of threads comprising the internal threads 18 on the primary cylinder 15 and the external threads 17 on the coupling cylinder 16. Because the first thread set 13 and 14 has the same sense as the second thread set 17 and 18, rotation of the primary cylinder 15 produces axial movement of that element and of the rotationally keyed coupling cylinder 16 in opposite directions relative to the support housing 11.

However, the velocities of these axial movements are not equal because of the nonuniform pitches provided. The primary cylinder 15 and the coupling cylinder 16 therefore function as a differential screw mechanism wherein rotation of the primary cylinder 15 produces axial movement of the coupling 16 relative to the fixed support housing 11 at a velocity equal to the difference between the individual axial velocities of both elements 15 and 16. Obviously, the direction in which the coupling cylinder 16 moves is determined by the direction in which the primary cylinder 15 is rotated.

Similarly, a third set of threads comprising the internal threads 27 on the coupling cylinder 16 and the external threads 26 on the secondary drive cylinder 25 have the same sense but a different pitch than a fourth set of threads comprising the internal threads 28 on the secondary cylinder 25 and the external threads 29 on the actuator 31. Again because the third and fourth sets of threads have a common sense, rotation of the secondary drive cylinder 25 produces axial movement of that element and of the rotationally keyed actuator rod 31 in opposite directions relative to the coupling cylinder 16. Thus, the secondary drive cylinder 25 and the actuator rod 31 also function as a differential screw mechanism wherein rotation of the secondary drive cylinder 25 produces axial movement of the actuator 31 relative to the coupling cylinder 16 at a velocity equal to the difference between the individual velocities experienced by members 25 and 31. Again, the direction of the actuator's differential axial movement is dependent upon the direction in which the secondary drive cylinder 25 is rotated.

The difference in pitch provided between the first and second sets of threads 13, 14 and 17, 18 is slightly different than the difference in pitch provided between the third and fourth sets of threads 26, 27 and 28, 29. This variation in pitch differences is established to provide unequal axial velocities for the coupling cylinder 16 and the actuator rod 31 relative to the support housing 11 in response to rotation of the primary cylinder 15 and the secondary cylinder 25 at the same rotational speed. Since the directions of differential movement experienced by the coupling cylinder 16 and the actuator rod 31 are determined, respectively, by the directions in which the primary cylinder 15 and the secondary cylinder 25 are rotating, appropriately selected directions of rotation can produce differential axial movements of the coupling cylinder 16 and actuator 31 which are either additive or in opposition. Opposing directions of axial movement by the actuator rod 31 and the coupling cylinder 16 result in axial movement of the rod 31 relative to the support housing 11 at a reduced velocity equal to the difference in individual velocities experienced by the coupling cylinder 16 and the rod 31. Since, as noted above, the individual velocities are themselves generated by differential screw mechanisms, it will be appreciated that the reduced double differential velocity experienced by the actuator rod 31 relative to the support housing 11 can be much lower than the individual velocities of the primary and secondary drive cylinders 15 and 25. Extremely precise movements, therefore, can be made with the actuator rod 31. Conversely, common directions of axial movement by the coupling cylinder 16 and the actuator rod 31 result in axial movement of the rod 31 relative to the support housing 11 at an increased velocity equal to the combined individual velocities of the two elements.

A preferred embodiment of the invention entails a thread relationship between the primary differential screw mechanism including elements 15 and 16 and the secondary differential screw mechanism including elements 25 and 31 such that the reduced differential axial velocity of the actuator 31 is produced by common directions of rotation of the primary drive cylinder 15 and the secondary drive cylinder 25. According to this arrangement, rotation of the drive shaft 58 and attached gear 57 (FIG. 1) in one direction produces rotation via the engaging teeth 52 and 53 of both the solid shaft 38 and the hollow shaft 44 in the opposite direction. This in turn induces rotation of the primary drive cylinder 15 and the secondary drive cylinder 25 in a common direction producing axial movement of the actuator rod 31 relative to the support housing 11 at the reduced differential axial velocity. Obviously, the direction of the actuators rod's axial movement is determined by the direction in which the drive shaft 58 is rotated. Thus, the desired double differential movement of the actuator rod 31 is provided with a relatively simple arrangement of elements. Furthermore, this embodiment insures equal rotational speeds for the primary and secondary drive cylinders 15 and 25 thereby firmly establishing the relative movement relationship between the pair of differential screw mechanisms and enhancing the actuators precision.

In the event that more rapid movement by the actuator rod 31 is desired for making coarse adjustments, the drive shaft 58 is shifted longitudinally out of contact with the teeth 52 on the hollow shaft 44 (downward as shown in FIG. 1) so as to engage only the gear teeth 53 on shaft 38. The shafts 55 and 58 are then rotated in the same direction producing opposite directions of rotation for the solid shaft 38 and the hollow shaft 44. This in turn induces opposite directions of rotation for the primary drive cylinder 15 and the secondary drive cylinder 25 resulting in the above described additive movement wherein the actuator rod 31 moves axially relative to the support housing 11 at a velocity equal to the combined individual velocities of the coupling cylinder 16 and the actuator 31. Thus, the disclosed actuator can provide either a low velocity actuator movement for fine adjustments or an increased velocity for relatively coarse adjustments. Again, the direction of actuator rod movement is determined by the directions in which the shafts 55 and 58 are rotated.

According to a specific example of the invention, the first set of threads 13 and 14 is provided with a pitch of one forty-ninth inch, the second set of threads 17 and 18 and the third set of threads 26 and 27 are provided with pitches of one-fiftieth inch, and the fourth set of threads 28 and 29 is provided with a pitch of one fifty-first inch. The sense used for threads 13 and 14 produces upward movement (as viewed in FIG. 1) of the primary drive cylinder 15 on support housing 11 in response to clockwise rotation and the sense used for threads 26 and 27 produces downward movement of the secondary drive cylinder 25 on the coupling cylinder 16 in response to clockwise rotation. Assuming then the operative position shown in FIG. 1, counterclockwise rotation of the shaft 58 induces clockwise rotation of the shafts 38 and 44 and accordingly of the primary and secondary drive cylinders 15 and 25. One clockwise revolution of shaft 38 moves the primary cylinder 15 axially upward 1/49=0.020408 inch on the support housing 11. Simultaneously, the rotatively keyed coupling cylinder 16 moves 1/50=0.020000 inch downward on the primary cylinder 15. Thus, the coupling cylinder 16 experiences a net upward movement of 0.020408−0.020000 =0.000408 inch relative to the support housing 11. The corresponding clockwise revolution of the secondary drive cylinder 25 moves it 1/50=0.020000 inch downward on the coupling cylinder 16. Simultaneously, the rotatively keyed actuator rod 31 moves 1/51=0.019608 inch upward on the secondary drive cylinder 25. The actuator 31, therefore, undergoes a net downward movement of 0.020000−0.019608 =0.000392 inch on the secondary cylinder 25. However, the secondary cylinder is also moved relative to the support housing 11 by axial movement of the coupling cylinder 16 on which it is supported. As noted above, the net movement of the coupling cylinder 16 is 0.000408 inch upward relative to the support housing 11. Thus, the composite axial movement of the actuator rod 31 relative to the support housing 11 in response to one clockwise revolution of the shafts 38 and 44 is 0.000408−0.000392=0.000016 inch in an upward direction. It will be obvious, that one counterclockwise revolution of the shafts 38 and 44 will produce in a similar manner the same amount of axial actuator movement relative to the support housing 11 but in the opposite direction.

The above example illustrates the improved fine adjustment capability of the invention. A single revolution of actuator movement induces 0.000016 inch of axial movement by the actuator rod 31. This is three orders of magnitude less than the axial movement experienced by the primary drive cylinder 15. Because of the substantial reduction in axial output movement relative to rotational input movement, microinch displacements can be achieved with a highly reliable mechanical actuator which also provides linear output movements rather than less desirable step displacements. Furthermore, the machining accuracy required for producing the device is within practically obtainable limits. Such accuracy is obtained, for example, in the manufacture of screw spindles for dividing machines for spectrographic gratings. According to another embodiment of the invention, operational flexibility is enhanced by utilizing different numbers of teeth on the gears 52 and 53. This arrangement produces different rotational speeds for the solid shaft 38 and the hollow shaft 44 in response to rotation of the shaft 58. In this way still another differential effect is obtained. Preferably, the difference in teeth number is small, e.g. one tooth more or less on the gear 52 than on the gear 53.

When used for coarse adjustments, the shaft 58 is shifted longitudinally eliminating engagement between gear 57 and the teeth 52. The shaft 55 is then driven in the same rotational direction as the shaft 58 producing opposite directions of rotation for shafts 38 and 44 and, accordingly, for the operatively coupled primary and secondary drive cylinders 15 and 25. Assuming clockwise rotation of the hollow shaft 44 and counterclockwise rotation of the solid shaft 38, one revolution of the primary cylinder 15 results in an upward movement of 0.020408 inch on the support housing 11. As described above, the rotatively keyed coupling cylinder 16 simultaneously moves 0.020000 inches downward on the primary cylinder 15 producing a net upward movement of the 0.020408−0.020000 inch=0.000408 inch relative to the support housing 11. The corresponding counterclockwise revolution of the secondary drive cylinder 25 produces downward movement thereof of 0.020000 inch on the coupling cylinder 16. Simultaneously, the rotatively keyed actuator rod 31 moves 0.019608 inch downward on the secondary drive cylinder 25 and, therefore, undergoes a net upward movement of 0.020000−0.019608=0.000392 inch. As before, however, the secondary cylinder 25 is also moved relative to the support housing 11 by axial movement of the coupling cylinder 16 on which it is supported. As described above, this movement is 0.000408 inch upward relative to the support housing 11. Thus, the composite axial movement of the actuator rod 31 relative to the support housing 11 in response to one revolution of the shafts 38 and 44 in opposite directions is 0.000408+0.000392=0.000800 inch in an upward direction. It will be obvious that revolution of each of the shafts 38 and 44 in the opposite directions will produce in a similar manner the same amount of actuator movement in a downward direction. A simple adjustment of the drive mechanism, therefore, increases by two orders of magnitude the velocity at which the actuator rod 31 moves in response to a given rotational drive velocity. This feature greatly facilitates use of the device for making relatively coarse adjustments.

Obviously, many modifications and variations of the present invention are possible in light of the above teachings. For example, other arrangements of the double differential screw mechanisms can be used including both parallel and inline connections. Also, pitch sense relationships other than those specifically described can be used depending upon the desired objectives.

I claim:

1. A motion-transmitting apparatus comprising:
   a fixed support,
   a primary drive means adapted for rotary movement and engaged by a first set of threads with said fixed support, said primary drive means adapted for axial movement relative to said fixed support in response to rotation,
   a secondary drive means adapted for rotary movement,
   a coupling means engaged by a second set of threads with said primary drive means and by a third set of threads with said secondary drive means, said first and second sets of threads having the same sense but different pitches,
   a coupling stop means adapted to prevent rotation of said coupling means,
   an actuator engaged by a fourth set of threads with said secondary drive means, said third and fourth sets of threads having the same sense but different pitches, and
   an actuator stop means adapted to prevent rotation of said actuator.

2. A motion-transmitting apparatus according to claim 1 wherein the difference in pitch between said first and second sets of threads is different from the difference in pitch between said third and fourth sets of threads.

3. A motion-transmitting apparatus according to claim 2 wherein the pitches and senses of said first, second, third and fourth sets of threads are adapted to produce relative axial movement between said coupling means and said actuator in response to rotation of said primary and secondary drive means.

4. A motion-transmitting apparatus according to claim 3 wherein the pitches and senses of said first, second, third and fourth sets of threads are such that a given amount of rotation of said primary and secondary drive means in the same direction produces axial movement of a given magnitude between said actuator and said fixed support, and said given amount of rotation of said primary and secondary drive means in opposite directions produces between said actuator and said fixed support a greater magnitude of relative axial movement.

5. A motion-transmitting apparatus according to claim 4 including a common drive mechanism adapted to rotate said primary drive means and said secondary drive means at the same angular velocity.

6. A motion-transmitting apparatus according to claim 5 including individual drive means adapted to permit independent rotation of said primary and secondary drive means.

7. A motion-transmitting apparatus according to claim 6 including biasing means adapted to maintain pressure between said first, second, third and fourth sets of threads.

8. A motion-transmitting apparatus comprising:
- a fixed internally threaded support,
- a hollow primary drive cylinder adapted for rotary movement and having external threads that engage the internal threads on said fixed support and form therewith a first set of threads, said primary drive means adapted for axial movement relative to said fixed support in response to rotation,
- a hollow secondary drive cylinder adapted for rotary movement,
- a hollow coupling cylinder having external threads that engage internal threads on said primary drive cylinder and form therewith a second set of threads, said first and second sets of threads having the same sense but different pitches,
- said coupling cylinder also having internal threads that engage external threads on said secondary drive cylinder and form therewith a third set of threads,
- a coupling stop means adapted to prevent rotation of said cylindrical coupling means,
- an actuator having external threads that engage internal threads on said secondary drive cylinder and form therewith a fourth set of threads, said third and fourth sets of threads having the same sense but different pitches, the difference in pitch between said first and second sets of threads being different than the difference in pitch between said third and fourth sets of threads, and
- an actuator stop means adapted to prevent rotation of said actuator.

9. A motion-transmitting apparatus according to claim 8 wherein the pitches and senses of said first, second, third and fourth sets of threads are such that a given amount of rotation of said primary and secondary drive means in the same direction produces axial movement of a given magnitude between said actuator and said fixed support, and said given amount of rotation of said primary and secondary drive means in opposite directions produces between said actuator and said fixed support a greater magnitude of relative axial movement.

10. A motion-transmitting apparatus according to claim 9 including a common drive mechanism adapted to rotate said primary drive means and said secondary drive means at the same angular velocity.

11. A motion-transmitting apparatus according to claim 10 including individual drive means adapted to permit independent rotation of said primary and secondary drive means.

12. A motion-transmitting apparatus according to claim 11 including biasing means adapted to maintain pressure between said first, second, third and fourth sets of threads.

13. A motion-transmitting apparatus according to claim 12 wherein said coupling and actuator stops comprise key means engaging said fixed support.

14. A motion-transmitting apparatus according to claim 13 wherein the difference in pitch between said first and second sets of threads is substantially equal to the difference in pitch between said third and fourth sets of threads.